July 23, 1940.  J. V. COSTELLO  2,208,664
CONNECTING ROD BEARING LOCK
Filed Feb. 10, 1938
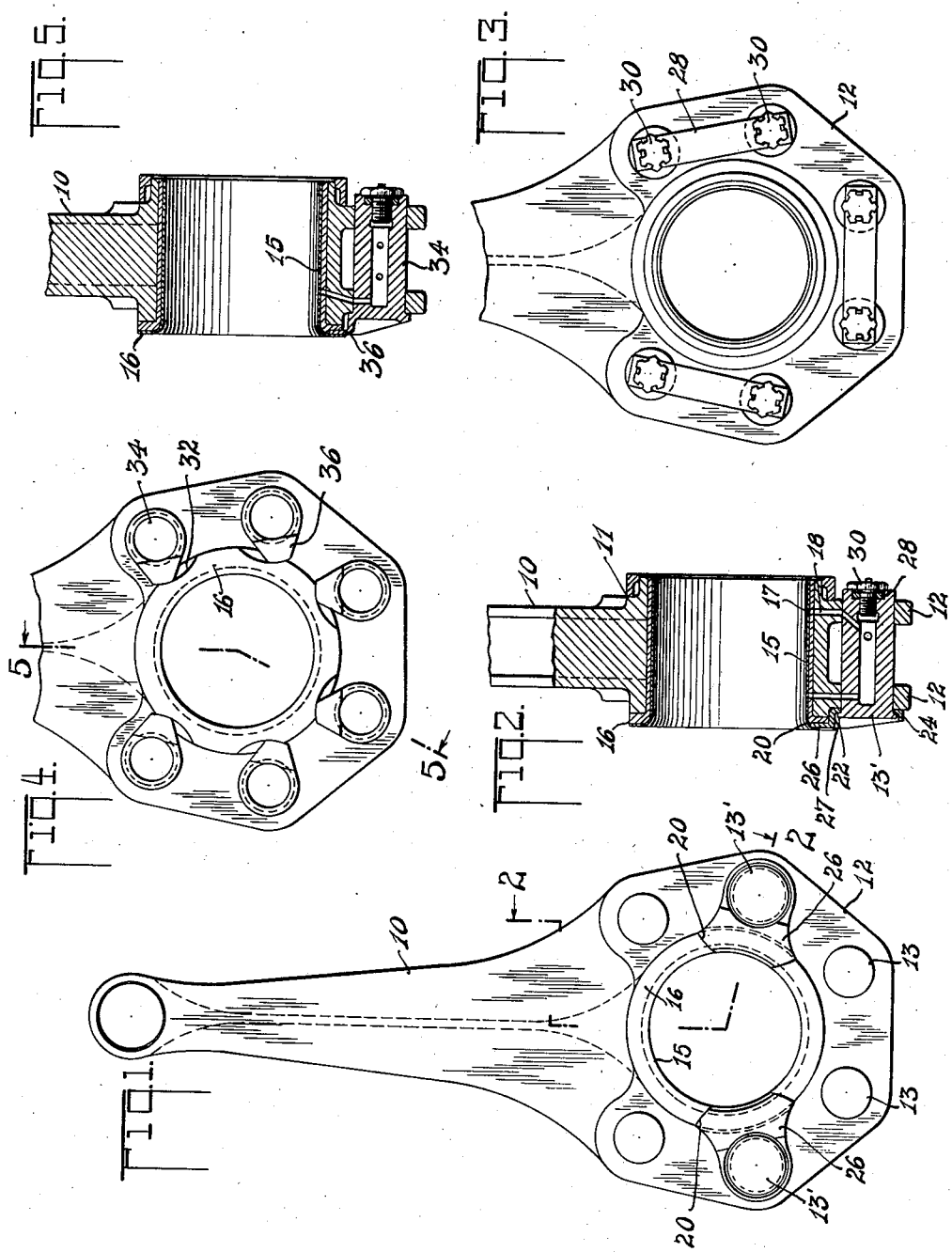
INVENTOR
JOHN V. COSTELLO
BY
ATTORNEY Patented July 23, 1940

2,208,664

UNITED STATES PATENT OFFICE 2,208,664

CONNECTING ROD BEARING LOCK

John V. Costello, Upper Montclair, N. J., assignor to Wright Aeronautical Corporation, a corporation of New York Application February 10, 1938, Serial No. 189,774

8 Claims. (Cl. 308—37)

This invention relates to connecting rods for radial cylinder engines, being particularly concerned with improvements by which a bearing shell in a connecting rod may be locked from rotation with respect to the rod, and from axial movement relative thereto.

The type of connecting rod to which the improvements are applicable is that in which the big-end of the rod is an integral piece, the rod being used with a crankshaft wherein one cheek of the shaft is clamped to the crankpin while the other cheek is integral with the crankpin. Accordingly, the bearing shell is a cylindrical part which ordinarily is a press fit in the rod. Since the bearing shell and rod have substantially radial oil holes which must be kept in alignment, it is necessary to provide means for restraining the shell from inadvertent rotation with respect to the rod. Likewise, if the bearing shell should creep rotationally with respect to the rod, the associated parts are apt to be weakened and damaged.

Objects of the invention will be apparent from the above remarks and will also be apparent in reading the annexed detailed description in connection with the drawing, in which:

Fig. 1 is an end elevation of a master connecting rod incorporating one embodiment of the invention;

Fig. 2 is a section on the line 2—2 of Fig. 1;

Fig. 3 is an opposite end elevation of the master connecting rod;

Fig. 4 is a fragmentary end elevation of a master connecting rod incorporating an alternative embodiment of the invention, and Fig. 5 is a section on the line 5—5 of Fig. 4.

The master rod comprises a rod portion 10 integral with a big-end 11 formed with flanges 12 bridged by knuckle pins 13'. A cylindrical bearing shell 15 is inserted in the rod and is provided with an end flange 16 serving to locate the shell axially in the rod. Although the shell 15 is a tight fit in the rod, it is subject to rotational creepage in service, which, if permitted, would misalign oil holes 17 and 18 in the shell and rod respectively to the prevention of proper lubrication of the knuckle pins and the auxiliary connecting rod journalled thereon. Likewise, such rotational creepage would cause damage to the parts. Accordingly, as indicated in Fig. 1, I provide arcuate recesses 20 in the flange 16, these being struck from centers of the knuckle pins 13'. Each knuckle pin 13' is provided with a head flange 22 engaging a locking element 24 having a projecting sector 26 engaging within the recess 20. It will be apparent that any tendency toward rotation of the bearing shell 15 will be resisted by the abutment of the flange with the sector 26, thereby preventing bearing creep. Likewise, since the recess 20 occupies only about half of the thickness of the flange 16, the sector 26 prevents the bearing shell from leftward axial displacement as shown in Fig. 2. The several knuckle pins 13' are locked from rotational or axial displacement by means of bars 28 bridging adjacent knuckle pins and anchored thereto by screws 30. The latter device for locking knuckle pins is old in the art and does not comprise a specific part of this invention.

Referring to Figs. 4 and 5, it will be seen that the shell flange 16 is provided with a plurality of smaller recesses 32 each concentric with one knuckle pin center. The knuckle pins 34 are each formed with an integral projection 36 engaging one of the recesses 32, alternate knuckle pins being slightly turned so that half of the pins will act to prevent rotation of the bearing shell in one direction, while the other half of the pins will prevent rotation of the bearing shell in the other direction. In this arrangement, the knuckle pins may be locked by the same means as is shown in Fig. 3 or by other equivalent devices.

In both embodiments, the bearing flange recesses are formed after the bearing is pressed into place, the recesses being conveniently formed by an end milling cutter piloted in the knuckle pin hole.

In the first embodiment shown, the sector 26 is locked axially by the knuckle pin 13', and the sector is locked from rotation by the upset portion 27 thereof bearing on a cylindrical portion of the master rod or the bearing flange 16. Forces arising from rotating tendencies in the bearing 15 are assumed tangentially thereof in line with the center of the knuckle pin 13'. The pins 13' are conventional turned parts, as shown, and are independently locked rotationally by the bars 28.

In the second embodiment, wherein the sector projections 36 are integral with the pins 34, it will be seen that in manufacture, the projections must be machined with proper relation to the slots engaged by the bars 28 but still, all the knuckle pins are similar.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a master connecting rod having knuckle pins circumferentially disposed around a main bearing opening, a flanged cylindrical bearing shell disposed in said opening and having arcuate recesses concentric with respective knuckle pins in the flange of said shell, end extensions carried by said pins engaging said recesses to prevent the shell from rotational and axial displacement in the rod, and means to lock said knuckle pins from rotation and displacement.

2. In a master connecting rod having a flanged crankpin bearing shell inserted in the rod, the flange of said shell having a notch, a knuckle pin parallel to the shell, engaging said rod, an element engaging the flange notch and the knuckle pin, and means to lock the knuckle pin and element to the rod.

3. In a master connecting rod, a bearing shell therein having a flange overlying an end face of the rod, said flange including an external recess, a key element engaging within said recess and overlying the rod and flange end faces, and means for locking said key element to the rod, said locking means comprising a knuckle pin parallel to said bearing shell and secured to the rod, said knuckle pin forming a journal for an auxiliary connecting rod.

4. In a master connecting rod, a flanged bearing shell the flange thereof projecting beyond an end face of the rod and having a recess formed therein, a knuckle pin axially parallel to and spaced from said shell, a projecting element carried by said pin at an end thereof and overlying the bearing flange, in locking engagement with said flange recess, and means for locking said knuckle pin.

5. In a master connecting rod having axially parallel bores adapted to receive respectively a main cylindrical bearing shell and a knuckle pin, the pin serving as a journal for an auxiliary connecting rod, said bearing shell having a recessed flanged portion projecting beyond an end face of the rod, means overlying the rod end carried by said knuckle pin and engaging said shell recess for holding the latter against displacement, and means securing the knuckle pin to the rod.

6. In a master connecting rod having axially parallel bores, a flanged cylindrical bearing shell engaged with the rod in one said bore, the bearing flange overlying an end face of the rod, a knuckle pin engaging within the other said bore and secured to the rod, and means at one end of said knuckle pin overlying the rod end and said bearing flange and clamped against the latter to secure same against rotation and axial displacement.

7. In a master connecting rod having axially parallel bores, a flanged cylindrical bearing shell engaged with the rod in one said bore, the bearing flange overlying an end face of the rod, a knuckle pin engaging within the other said bore and secured to the rod, and means at one end of said knuckle pin overlying the rod end and said bearing flange to secure same against rotation and axial displacement, said flange having a recess within which said knuckle pin means engages.

8. In a master connecting rod having axially parallel bores, a flanged cylindrical bearing shell engaged with the rod in one said bore, the bearing flange overlying an end face of the rod, a knuckle pin engaging within the other said bore and secured to the rod, and means at one end of said knuckle pin engaging said bearing flange to secure same against rotation and axial displacement, said flange having an arcuate recess concentric with the knuckle pin within which said knuckle pin means engages, the latter comprising a concentric head portion integral with the knuckle pin.

JOHN V. COSTELLO.